(12) United States Patent
Vassigh et al.

(10) Patent No.: US 8,144,120 B2
(45) Date of Patent: Mar. 27, 2012

(54) METHOD AND SYSTEM FOR BUTTON PRESS AND HOLD FEEDBACK

(75) Inventors: Ali Vassigh, Bellevue, WA (US); Thorben Neu, Los Angeles, CA (US)

(73) Assignee: Belkin International, Compton, CA (US)

( * ) Notice: Subject to any disclaimer, the term of this patent is extended or adjusted under 35 U.S.C. 154(b) by 636 days.

(21) Appl. No.: 11/564,787

(22) Filed: Nov. 29, 2006

(65) Prior Publication Data

US 2008/0126975 A1    May 29, 2008

(51) Int. Cl.
*G09G 5/00* (2006.01)
*G06F 3/00* (2006.01)

(52) U.S. Cl. .................. 345/156; 345/169; 715/719

(58) Field of Classification Search ............... 345/156, 345/168–173; 34/156–173
See application file for complete search history.

(56) References Cited

U.S. PATENT DOCUMENTS

| | | | |
|---|---|---|---|
| 6,169,540 B1 | 1/2001 | Rosenberg et al. | |
| 6,727,830 B2 * | 4/2004 | Lui et al. | 341/20 |
| 7,126,581 B2 * | 10/2006 | Burk et al. | 345/156 |
| 7,158,047 B2 * | 1/2007 | Ushida | 340/825.72 |
| 7,375,673 B2 | 5/2008 | Spilo | |
| 7,489,297 B2 * | 2/2009 | Hohmann et al. | 345/158 |
| 2006/0152495 A1 | 7/2006 | Gombert | |
| 2006/0161690 A1 | 7/2006 | Kavanagh et al. | |
| 2006/0166728 A1 | 7/2006 | Cornell et al. | |
| 2006/0215987 A1 | 9/2006 | Horentrup et al. | |

\* cited by examiner

*Primary Examiner* — Duc Dinh
(74) *Attorney, Agent, or Firm* — O'Melveny & Myers LLP

(57) ABSTRACT

The present invention provides a method and system for providing a user with feedback as to the status of the command they have initiated by depressing a button, series of buttons or sequence of buttons on a human interface device ("HID") for a time period beyond a fraction of a second to activate a function. In one embodiment, feedback provided for a press and hold ("P+H") operation informs the user that their button press action has been detected by a multi-function device ("MFD") and a visual and/or audible indication is provided, informing him or her to continue pressing the button or buttons on the HID to activate one or more functions. A graphical display with a periodically updated progress bar displays how much longer the user should continue pressing the button or buttons to successfully transmit a command to the MFD with an animation showing which command will be activated.

34 Claims, 4 Drawing Sheets

METHOD AND SYSTEM FOR BUTTON PRESS AND HOLD FEEDBACK

BACKGROUND OF THE INVENTION

1. Field of the Invention

The present invention relates generally to control panels and remote control input devices for multi-function electronic devices, and more particularly to a method and system for providing button press and hold feedback to the user when a button, sequence or combination of buttons are depressed.

2. Description of Related Art

There exist various activation methods for consumer electronic devices, most of which involve the application of mechanical force by a user to an electromechanical input device. Some common examples include a user pressing a button, holding a switch, pushing a sliding mechanism to one side, spinning a dial, and the like. Because all of these such methods involve converting mechanical force to an electrical impulse or signal, these activation methods will collectively be referred to as a "button press" or "depressing a button" herein. Further, there are many ways in which a button press operation can be used to activate a command on an electronic device. For example, a single button push and release ("P+R") operation, multiple button push and release operation, and a button push and hold ("P+H") operation can be used to cause a button command signal that controls an electronic device or multi-function device ("MFD") that is capable of performing multiple commands. Designers and engineers can enable devices to behave differently and perform different functions with each type of button press. For example, single button P+R operations are often used to provide response or feedback after button activation. Similarly, some electronic devices require a P+H operation whereby, after a single button or combination of buttons are depressed for a requisite time period, a certain response or action occurs.

Currently, there are methods available for providing user feedback when a single button, multiple buttons simultaneously, or a sequence of buttons are depressed on a human interface device such as a remote control device or a computer. Some of these methods pertain to game type applications, virtual reality simulations, computer aided design ("CAD") systems, operating a graphical user interface ("GUI"), or otherwise influencing events or images depicted on a screen. With such systems, a force sensation or feedback is felt by the user when a button or sequence of buttons is activated. With some interface devices, the feedback to the user can be in the form of tactile and/or haptic feedback, also known as "force feedback."

Other systems provide feedback to users of systems utilizing infrared ("IR") communications between a remote control device and a computer or other electronic device. Such systems rely on continuous communications and are susceptible to breaks in communication due to misalignment of the IR beam with respect to the remote control device. The feedback provided by such systems alerts the user to the loss of the communications link while buttons are depressed on the remote control device.

Certain systems currently exist that provide feedback to the user when a button or sequence of buttons is depressed, but are specific to a particular type of system such as a player, reader or writer of optical storage media. Such systems typically provide feedback to the user by an indicator or a highlighted arrow showing that the button is currently selected or activated. More advanced systems can provide the user with a greater level of feedback when the button or buttons are activated (e.g., an image changing color or shape may occur, a moving cartoon or series of pictures appear, or even a speech sequence is played), thereby indicating to the user that the particular function selected by the user has been activated.

One drawback with existing systems is the lack of specific feedback as to the duration the user needs to continue pressing the button or buttons to activate or complete a desired system function, command or selection. Specifically, without feedback, users are left wondering how long they must continue pressing a button, or even if their button press is being detected. When a user presses and holds a button or multiple buttons, there is a need for a method and system to provide immediate and continual feedback during the P+H time, in order to clearly communicate the state of the device and properly manage user expectations. Appropriate and timely feedback would help a user maintain a sense of control over the remotely located system. Uncertainty caused by a lack of feedback can cause the user to have a poor overall product/brand experience.

SUMMARY OF THE INVENTION

The present invention provides a method and system for providing a user with feedback information as to the status of a command the user has initiated by depressing a button, series of buttons or sequence of buttons on a human interface device ("HID") in order to activate a command to an electronic device or multi-function device ("MFD").

When the button or buttons are depressed for any length of time beyond a fraction of a second in a button push and release ("P+R") operation, the user often does not know how much longer she needs to continue depressing the button or buttons to activate a desired command on the MFD. This is especially true when activating the command to the MFD requires a series of buttons to be depressed in sequence, wherein the user must hold each button in the depressed position for a specific time period before pressing the next button.

In one embodiment of the present invention, user feedback information is provided by the system for a button press and hold ("P+H") operation, wherein the system informs the user that the button P+H operation has been detected by the MFD via visual and/or audible indicators on the HID that inform the user that she needs to continue pressing the button or buttons on the HID. In a preferred embodiment, a graphical indication is provided as to how much longer the user should continue pressing the button or buttons to successfully transmit a command to the MFD with an animation informing the user of which command will be activated once the button or buttons have been pressed for the required time. Additionally, a periodically updated progress bar is displayed on the HID indicating the time remaining for the P+R operation to be successful. In some embodiments, the visual feedback to the user takes the form of an animated element traveling along the length of the progress bar to represent remaining time for a successful command signal to be transmitted to the MFD.

In another embodiment, an audible sound providing feedback to the user at the commencement of the button P+H operation is generated by the system to confirm that the button press operation has been detected, as well as when the minimum time to complete the P+H operation has been reached. Another audible sound is generated once a button or series of buttons have been depressed to complete the desired button P+H operation. Other embodiments have audio feedback supplementing the visual feedback provided to the user.

A more complete understanding of the method and system for providing button press and hold feedback to the user when a button, sequence or combination of buttons are depressed will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method and system for providing a user with feedback information as to the status of a command the user has initiated by depressing a single input button, series of input buttons or sequence of input buttons on a human interface device ("HID") in order to activate a command to an electronic device or multi-function device ("MFD") that is capable of performing multiple commands. Together, the human interface device and the multi-function device comprise an interactive system. There are many methods of accepting input from a user to activate a command on an MFD entered via an HID. Such methods all involve converting mechanical force to an electrical impulse or signal by an input sensing component. Some common examples include a user pressing a button, holding a switch, pushing a sliding mechanism to one side, spinning a dial, and the like. Therefore, these activation methods will collectively be referred to as a "button press" or "depressing a button" herein. In the detailed description that follows, like element numerals are used to indicate like elements appearing in one or more of the figures. It should be appreciated that while embodiments of the present invention described herein relate to an FM radio receiver, the present invention is not so limited, and is further applicable to systems comprised of all types of electronic devices that are coupled to human interface devices including, but not limited to, various consumer electronics, audio, video, computer, and gaming systems.

Figure 1A:
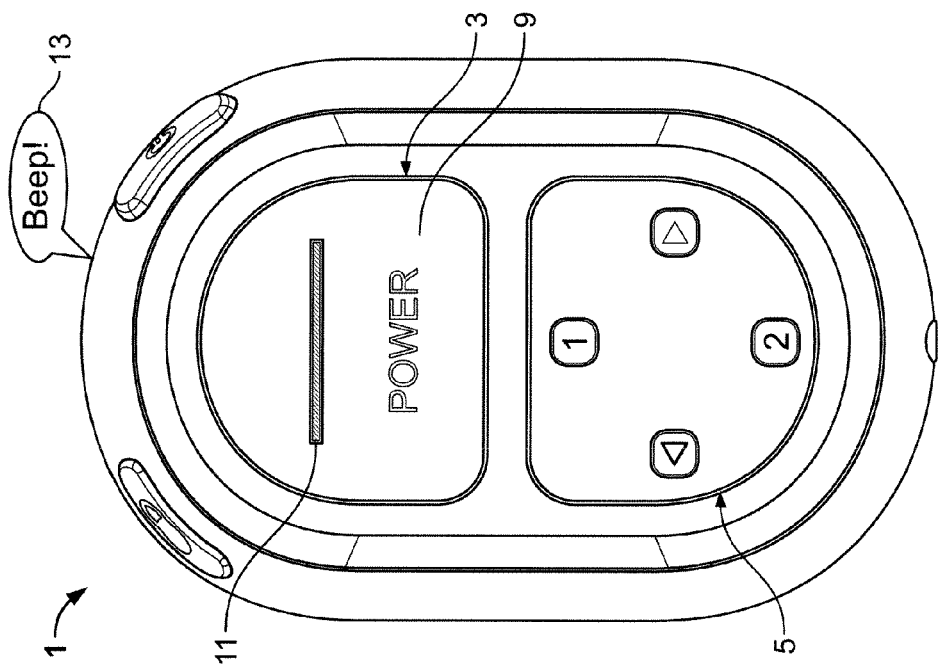
FIGS. 1A-1C illustrate various functions of an exemplary interactive apparatus comprised of a multi-function device and a human interface device, wherein a single button press and hold operation is performed and a progress bar is displayed in accordance with one embodiment of the present invention.
Figure 1B:
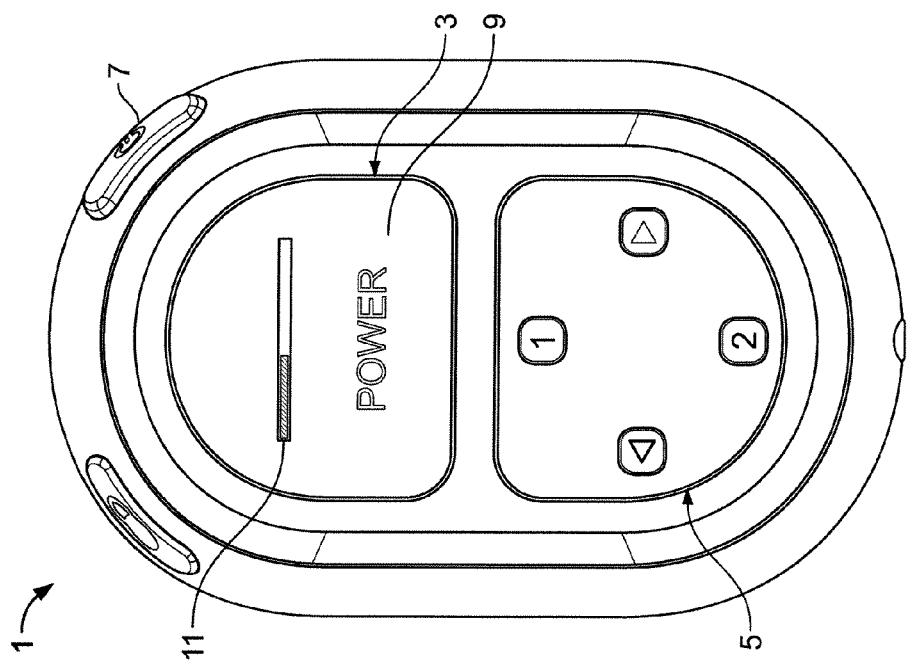
Figure 1C:
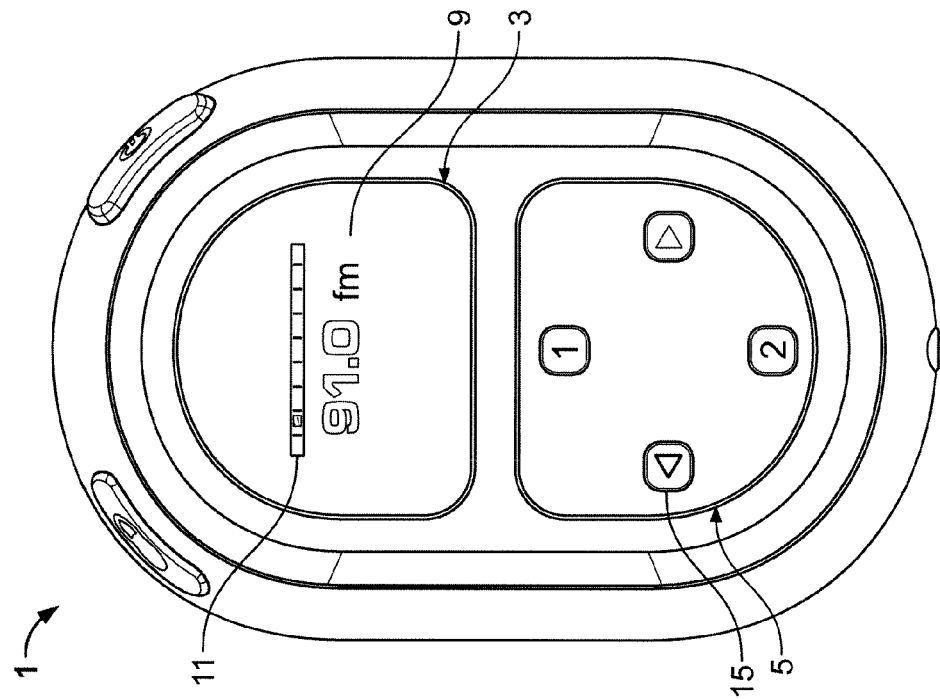

FIGS. 1A-1C illustrate various functions of an exemplary interactive apparatus comprised of a multi-function device and a human interface device operatively coupled to an MFD, wherein a single button press and hold ("P+H") operation is performed. In one embodiment of the present invention, human interface device 1 ("HID") comprises a display unit or display area 3, a button area 5, a power button 7, mode selection button 8, a command image 9, an animated graphical image 11, and an audio sound clip 13. The MFD is in communication with the HID 1 and as shown in FIGS. 1A-1C, 2, and 3, the MFD (not shown) and the HID 1 are physically contained within the same housing, wherein the HID is a front panel or faceplate of the MFD. The MFD illustrated is an exemplary portable FM radio receiver; however, the MFD can comprise other electronic devices such as a portable music player (including an MP3 or CD-ROM player), a DVD recorder, a home theater system, a cable TV control box, an electronic game, or the like. Further, as will be explained in further detail below with respect to FIG. 4, the MFD can be physically separate from the HID 1, wherein the MFD and the HID 1 preferably communicate wirelessly. In the embodiments disclosed, the MFD contains an internal processor unit (not shown) that allows it to process an incoming command signal, determine what function has been selected by the user, and then to execute the corresponding command.

As shown in FIGS. 1A and 1B, power button 7 can be depressed by a user in a button P+H operation. An audio output signal, audio message or audio sound clip 13 (in the form of a simple audible tone or "beep") is emitted from HID 1 when power button 7 is first depressed (after a very brief period of time such as a few hundred milliseconds) to notify and acknowledge to the user that the initialization of a button press operation has been detected by HID 1. Next, the audio sound clip 13 is played a second time once the power button 7 has been depressed for an adequate time period to complete the button P+H operation. In other embodiments, audio sound clip 13 can comprise a complex audio signal such as a combination of tones or a short musical interlude. Further, a different audio sound clip 13 may be played upon completion of a button P+H operation than the audio sound clip 13 played at the start of the button P+H operation. While the audio sound clip 13 is being emitted, the animated graphical image 11 can be simultaneously displayed together with the command image 9 in the display area 3. In another embodiment, one or more graphical images can be used to provide feedback to the user in lieu of the audio sound clip 13.

The command image 9 indicates to the user which command signal (not shown) will be sent to the MFD for execution once the button P+H operation has been completed by the user depressing the power button 7 for the requisite time ("activation time"). This is of benefit to a user when a variety of different buttons can be pressed to activate corresponding commands in either the button area 5 or other buttons located along the body of the HID 1. In the embodiment of FIGS. 1A and 1B, command image 9 displays the text based message or word "Power," illustrating a button P+H operation to power on and off the MFD. In contrast, in FIG. 1C, command image 9 displays an image with text and an arrow indicating that the MFD will switch radio reception modes from stereophonic to monophonic once the mode selection button 8 has been depressed long enough to complete the button P+H operation.

A benefit of the present invention is that the use of the animated graphical image 11 that provides feedback information to the user as to how much longer she needs to continue depressing the button selected (here, power button 7) by way of an animated progress indicator, which is periodically updated, and continues until the power button 7 has been depressed for the requisite time period to generate a command signal from the HID 1 to the MFD. In effect, the shaded portion of the animated progress indicator illustrates the percentage completed of the button P+H operation. Upon completion, the audio sound clip 13 is emitted to confirm to the user that that she has depressed power button 7, as mentioned above. The same use of the animated graphical image 11 in the form of a real-time animated progress indicator is illustrated in the embodiment of FIG. 1C, which additionally makes use of the emission of the audio sound clip 13 at completion time of the button P+H operation. More specifically, FIG. 1C illustrates the mode selection button 8 being depressed in a button P+H operation that activates a command, wherein the MFD changes from stereophonic to monophonic mode.

It should be apparent to those skilled in the art that other ways of providing feedback information to the user acknowledging that a button P+H operation has been initialized and communicating the amount of time remaining to reach activation time. In other embodiments, feedback information is conveyed to the user by different forms of the animated graphical image 11. For instance, in one embodiment, animated graphical image 11 is a progress bar, wherein the shaded portion moves to the right in real-time, becoming fully shaded when the activation time has been reached. In another embodiment, the animated graphical image 11 changes color from red to yellow to green as the activation time is reached. In another embodiment, the animated graphical image 11 is a number with a percentage sign next to it advancing from 0% to 100% as the activation time is approached. In yet another embodiment, the audio sound clip 13 is a recorded or synthesized human voice audibly counting down words indicating the time remaining as the activation time approaches, which can be accompanied with the animated graphical image 11, wherein the image changing in sync with the count down.

Figure 2:
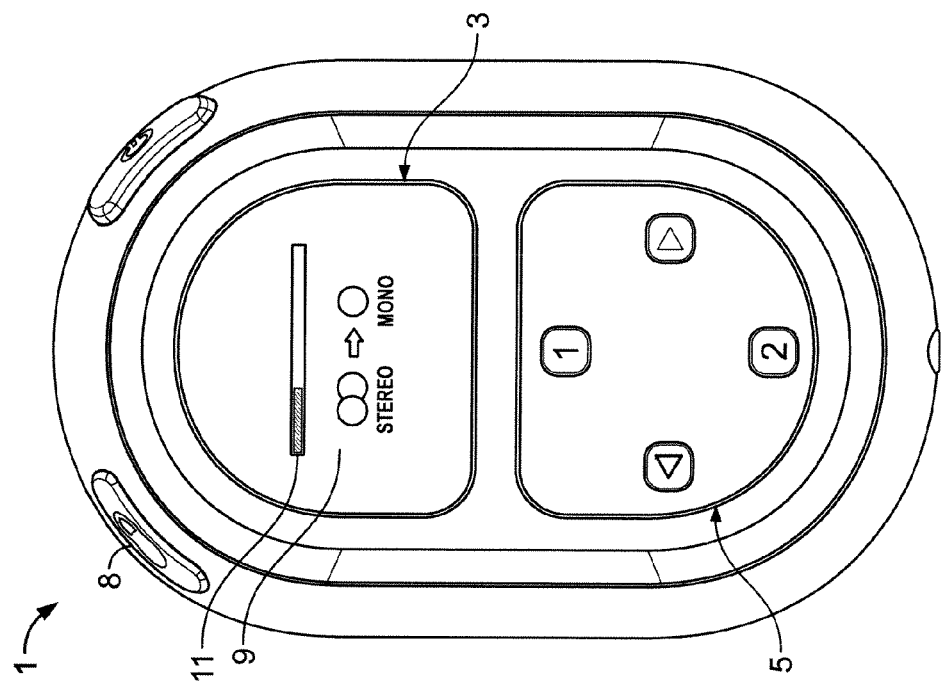
FIG. 2 illustrates an exemplary interactive apparatus comprised of a human interface device, wherein a single button press and hold operation is performed and a linear scale is displayed in accordance with one embodiment of the present invention.

FIG. 2 illustrates an exemplary interactive apparatus comprised of a multi-function device and a human interface device, wherein a single button press and hold operation is performed and a linear scale is displayed in accordance with one embodiment of the present invention. This embodiment is similar to that illustrated in FIGS. 1A-1C, except that a different button is depressed on the HID 1 to activate the button P+H operation of changing the frequency the MFD (here an exemplary FM radio receiver) is tuned to. In the embodiment illustrated, when the user depresses a downward radio tuning button 15, the command image 9 displays an image with an icon "fm" symbolizing that the MFD is in the fm radio reception mode and command image 9 also display a numeric message that corresponds to the frequency the radio is currently tuned to. As the downward radio tuning button 15 is continuously depressed, the right-most digit of the command image 9 counts downward. After a set period of time, the count speed increases and if the downward radio tuning button 15 continues to be depressed, the animated graphical image 11 displays an image of an analog radio dial with a small shaded rectangle that "slides" along the dial to the left, similar to an old-fashioned analog fm radio of yesteryear.

Figure 3:
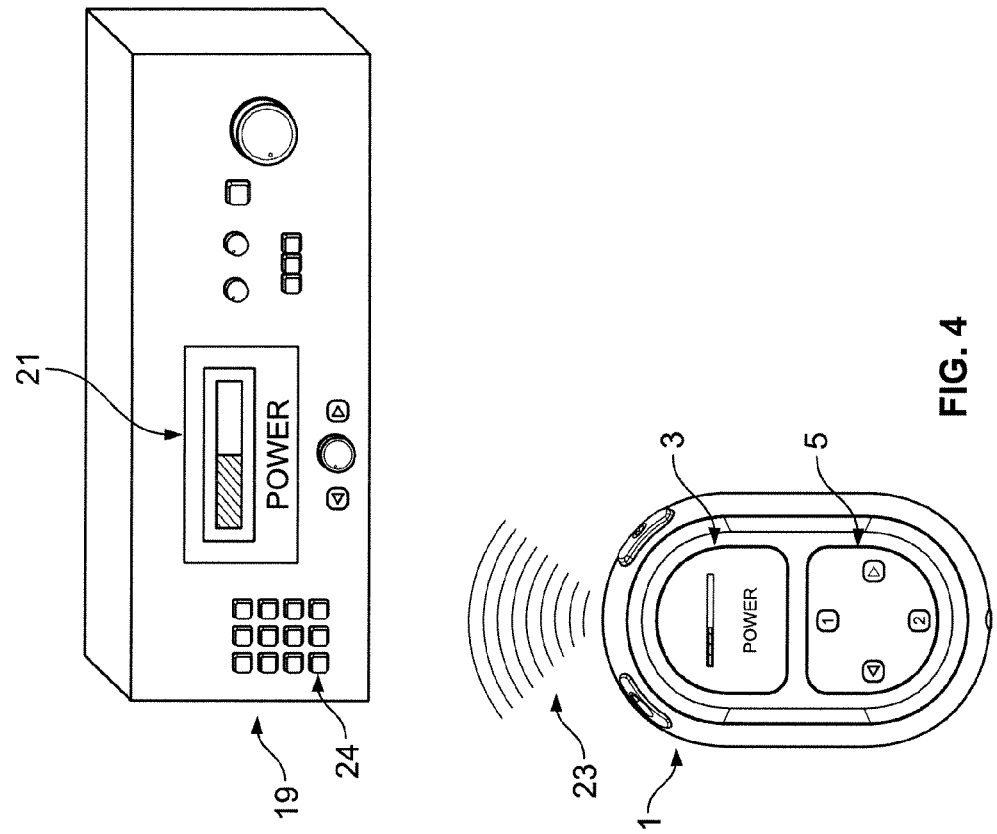
FIG. 3 illustrates an exemplary interactive apparatus comprised of a multi-function apparatus and a human interface device, wherein a multiple button press and hold sequence is performed and a progress bar and icon message is displayed in accordance with one embodiment of the present invention.

FIG. 3 illustrates various functions of an exemplary interactive apparatus comprised of a multi-function device and a human interface device, wherein a multiple button press and hold sequence is performed and a progress bar and icon message are displayed. This figure illustrates the use of the present invention when a series of button P+H operations are accomplished by two different buttons being depressed in a specific sequence on the HID 1 to activate a desired command to the MFD. As MFD's continue to get smaller in physical size with each iteration, the ability to reduce the number of buttons to be depressed by the user on the HID to activate a command on the MFD is clearly of benefit. The present invention allows a single button to be depressed for a time period that is longer than a first time period and a second time period, signifying two different functions to be performed by the MFD or a series of a few buttons to be depressed by a user easily and assuredly in sequence so as to replace what would require a much larger volume of buttons that are only depressed once for each available command or function to be performed by the MFD. In other words, the method allows a single button on the HID 1 to be assigned to a plurality of functions, wherein the same button depressed for an extended time period or a single button depressed in sequence with other buttons activates different commands to the MFD.

In FIG. 3, a radio station memory store function or command is illustrated. This function comprises a first function and a second function. To activate this function, first a user performs a button P+H operation, wherein the downward radio tuning button 15 or an upward radio tuning button (not shown) is depressed until the HID 1 indicates the desired radio frequency by the command image 9 in the display area 3. This is the first function to be performed by the MFD upon receipt of a first command signal generated by the HID 1. The feedback information provided to the user by way of an acknowledgement signal up to this point is the same as was described in the discussion of FIG. 2, above.

Next, a second button P+H operation is performed by the user depressing memory button 17 while the command image 9 changes to display an image with a rightward arrow and the number "1" to indicate to the user that the selected frequency will be stored into a memory location 1 on the MFD, after the sequence of button P+R operations are completed. This is the second function to be performed by the MFD upon receipt of a second command signal generated by the HID 1. Completion of the operation is achieved by the user depressing the memory button 17 for the requisite time period for the HID 1 to issue a second command signal to the MFD. Additional feedback information is provided to the user as to how much longer to continue depressing memory button 17 by the acknowledgement signal that causes the animated graphical image 11 that takes the form of a real-time or continuous animated progress indicator to appear in the display area 3. This operation is illustrated in the embodiment of FIGS. 1A-1C, described above. It should be apparent to one skilled in the art that other button P+H operations can be combined in different ways with similar feedback information provided to the user of the HID 1 and the MFD, wherein different images are displayed by the command image 9 and the animated graphical image 11 in the display area 3 appropriate to the command the user is activating by the combination of button P+H operations.

In another embodiment, a single input button on the HID 1 is depressed for a first time period until the first command signal is sent to the MFD, wherein it performs a first function of activating a memory store function. As the single input button continues to be depressed beyond the first time period and exceeds a second time period, a second command signal is sent to the MFD which performs the second function of selecting the direction to alter the radio frequency the MFD is tuned to (downwards or upwards). When the user now continues to depress the same input button beyond this second time period, the MFD changes frequencies in a downward direction continuously until the user releases the single input button she has been depressing to select a desired radio frequency to store in a memory register location of the MFD. During the time the single button is depressed, the user receives continuous feedback information in the display area 3.

Figure 4:
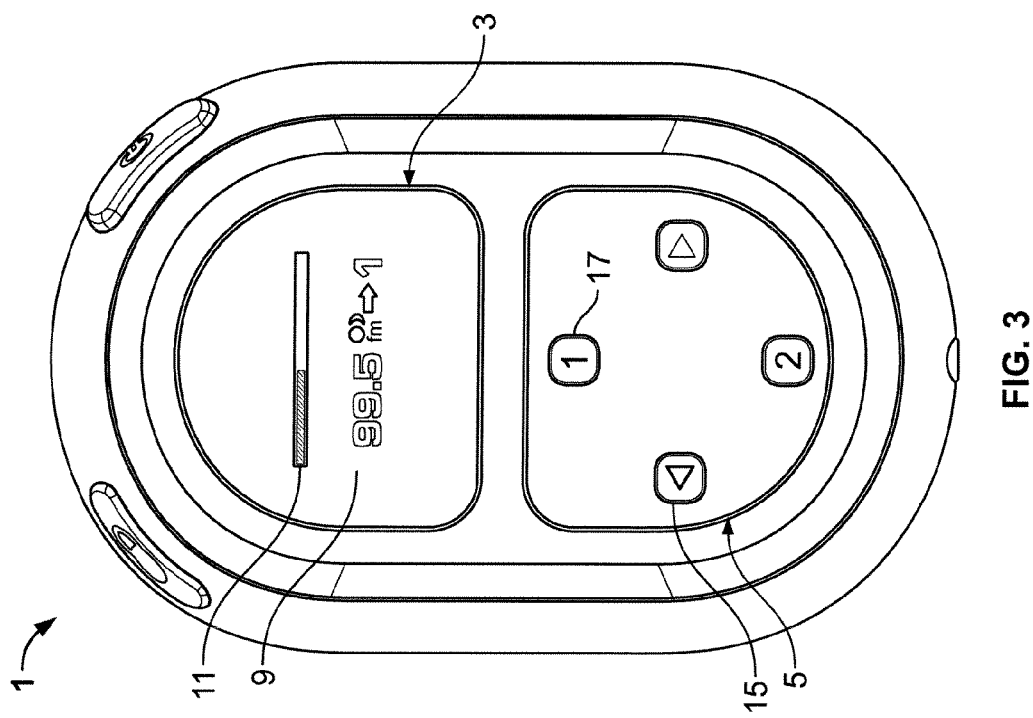
FIG. 4 illustrates an exemplary interactive system showing a first multi-function device comprising a human interface device communicating with a second multi-function device in accordance with another embodiment of the present invention.

FIG. 4 illustrates an exemplary interactive system showing a first multi-function device comprising a human interface device communicating with a second multi-function device in accordance with another embodiment of the present invention. In this embodiment, the HID 1 is combined with a first MFD into a single housing and the first MFD communicates with a second multi-function device 19 ("MFD"). The first MFD illustrated is a remote control device that communicates wirelessly with the MFD 19, which comprises a radio receiver; however, in other embodiments MFD 19 is a another type of electronic device such as a DVD recorder, CD-ROM player, Digital Audio Tape ("DAT") recorder, cable TV control box, digital video recorder, or a game console. The HID 1 accepts input from a user entered by the pressing of one or more buttons in the button input area 5 and holding the button (s) down for a sufficient time to activate a command by a button P+H operation, while a visual progress graph and message are visible to the user in display area 3 inform the user how long she needs to continue pressing the button(s). Once the P+H operation has been performed for a sufficient time period, the human interface device transmits a command signal by an internal transmitter (not shown) to the MFD 19 via a wireless signal 23. The MFD 19 receives the wireless signal by an internal receiver (not shown) and processes the signal through an internal processor unit (not shown) so that activation is achieved and the function selected by the user on the HID 1 on the first MFD is performed. The wireless signal 23 can be transmitted by a variety of communication technologies and protocols such as, but not limited to, a radio frequency signal, an infrared beam or even in accordance with an IEEE 802.11x LAN protocol.

FIG. 4 also illustrates a feature wherein the MFD 19 starts to receive the wireless signal 23 when the P+H operation is initiated on the HID 1 and MFD 19 displays a progress graph indicating the status of the P+H operation in real-time in display area 21, as well as the appropriate command name. The information displayed in display area 3 appears simultaneously with the same information appearing in display area 3 of the HID 1. Display area 21 can also be activated by commands directly entered on a keypad 24. The information displayed in display area 21 is the same whether the button P+H operation is entered via the keypad 24 on the MFD 19 or via the button area 5 on the HID 1. It should be appreciated that other types of information can be additionally displayed in display area 21, such as an illuminated area and symbols or letters indicating whether the button P+H operation is being received from the keypad 24 or the button area 5.

In one embodiment of the present invention, the MFD 19 solely recognizes commands entered by button P+H operations. In such systems, feedback information to the user can begin as soon as a button is depressed. In another embodiment, the button offers both P+R and P+H and when the button is depressed, the HID 1 waits a short period of time (e.g., approximately one half a second) to see if the button will be released. If the button is released and the button depressed corresponds to a recognized P+R command, then immediate feedback information is provided to the user by, for example, the audio sound clip 13 in the form of an audible beep and the command image 9 displaying an illuminated image or word temporarily in display area 3. The command signal is then transmitted to the MFD 19 via the wireless signal 23. If the depressed button is not released after the short period mentioned above, then the HID 1 starts providing button P+H operation feedback information to the user. In all P+H operations, once the P+H feedback starts, it continues until either the button is released (thereby terminating the attempted issuance of a command) or until the required button hold period has been reached and the command signal has been generated for the appropriate command entered by the user.

Figure 5:
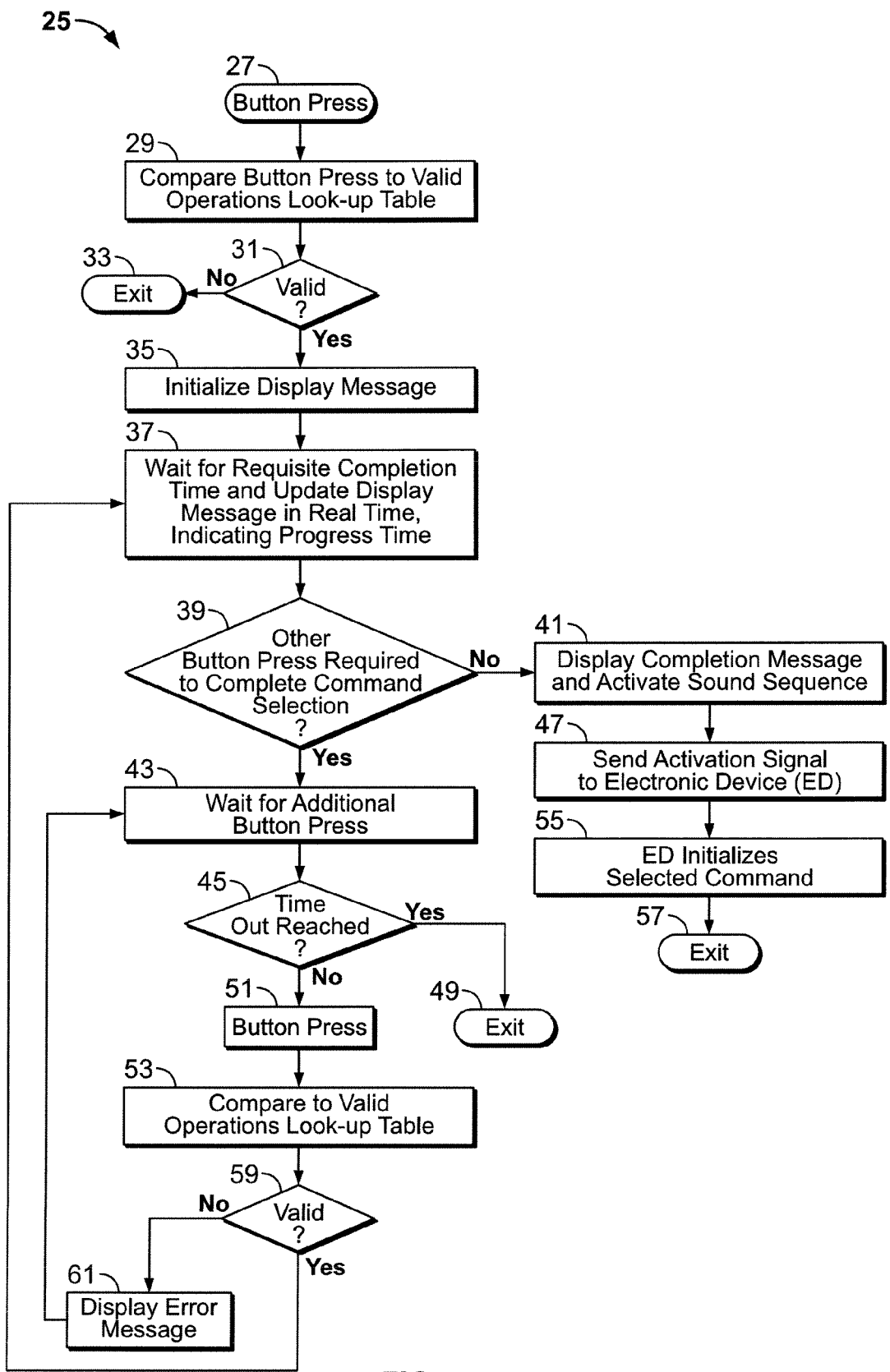
FIG. 5 is a flow chart illustrating an example of a method of providing button press and hold feedback information to a user in accordance with the present invention.

FIG. 5 is a flow chart illustrating an exemplary method 25 of providing button press and hold feedback information to a user in accordance with the present invention. When the user presses a button on a HID, the HID senses that a button was depressed via step 27 and then checks to see if the button was depressed at a point in time when an MFD will validly accept input from the user and if so, if the particular button when pressed either alone or in sequence with other buttons is a valid button P+H operation by comparing the button pressed against a look-up table of valid button P+H operations via steps 29 and 31. If the button P+H operation is not valid, then the method terminates via step 33; otherwise, the method proceeds to step 35 and initiates a display message (or image) and/or emission of an audible sound. The HID then waits for the requisite time period for the button to continue to be depressed to issue a command signal via step 37. During the wait time, at step 37, the display on the HID provides feedback information to the user by the use of an animated graphical image that takes the form of a periodically updated animated progress indicator, as illustrated in the exemplary embodiment of FIGS. 1A-1C, described above. Simultaneously, in display area 3 command image 9 displays an appropriate word relative to the command that will be sent to the MFD when the initialized button P+H operation is completed, such as "Power," illustrating a button P+H operation to power on and off the MFD.

Next, with continued reference to FIG. 5, the HID validates the initiated button P+H operation to determine other buttons that are required to complete a valid button P+H operation (per a lookup table or in other embodiments, by other commonly used method to validate data) via step 39. If the HID is not waiting for any additional buttons to be depressed to complete the button P+H operation, then as illustrated in the exemplary embodiment of FIGS. 1A-1C described above, a display completion message (which can include images in some embodiments) in display area 3 provides feedback to the user by the periodic update to the animated graphical image 11 and activation of the audio sound clip 13 via step 41 of FIG. 5. At step 41, activation has been achieved and an activation signal or command is sent to the MFD by the HID via step 47. If as illustrated in the embodiment of FIG. 4, the HID is a remote control device physically separated from the MFD, then the command signal is sent from the HID to the MFD via the wireless signal 23. The MFD then initializes the command selected by the user when she completed the button P+H operation via step 55 of FIG. 5 and the method ends at step 57.

If the HID 1 is in fact waiting for additional buttons to be depressed by the user at step 39, then the HID 1 waits for a pre-set time via step 43 and if no other required buttons to complete a valid command are depressed by the user, then the button P+H operation initiated by the user times out at step 45 and is terminated at step 49. Alternatively, if the user does depress another button before timeout via step 51, then the HID 1 once again checks if it is part of a valid button P+H operation via step 53. If at step 59 the additional button depressed is not valid to complete a button P+H operation, then an error message is displayed in the display area 3 via step 61 and the HID 1 returns to step 43 to wait for another alternate button to be depressed by the user. Alternatively, if the additional button depressed is valid at step 59, the HID 1 returns to step 37 and once again waits for completion time of the button P+H operation, with the display area 3 providing audio and visual feedback to the user as described above. In some embodiments, a larger number of buttons need to be depressed in a valid button P+H operation to achieve activation and accordingly, steps 37 to 59 may be repeated multiple times. It should be appreciated that various other detailed steps can be used in alternate embodiments of the invention to achieve the same scope and spirit of the method illustrated by FIG. 5. For example, validation of buttons depressed in a button P+H operation has been presented using look-up tables, but it should be apparent that in another embodiment, many of the inventive steps described above would be equally applicable to the use of other data structures to validate buttons depressed by the user in a button P+H operation. In another embodiment, a second button press called for in steps 39 and 43 can comprise the first button pressed being continuously pressed for a second time period rather than a second button being depressed for the second time period to complete the command selection.

Having thus described a preferred embodiment of providing button press and hold feedback to the user when a button, sequence or combination of buttons are depressed, it should be apparent to those skilled in the art that certain advantages of the described method and system have been achieved. For example, the use of a the visual display providing the user with feedback information that is periodically updated to indicate how much longer the user must continue to depress a button or series of buttons on the HID to generate an command signal to the MFD has been illustrated, but it should also be appreciated that various modifications, adaptations, and alternative embodiments thereof may be made within the scope and spirit of the present invention. The invention is solely defined by the following claims.

What is claimed is:

1. An interactive apparatus, comprising:
a multi-function module adapted to perform a first function upon receiving a first command signal and a second function upon receiving a second command signal; and
an interface component comprising:
a processor unit operatively coupled to the module;
an input button operatively coupled to the processor unit; and
a feedback indicator operatively coupled to the processor unit;
wherein the feedback indicator provides acknowledgement information to a user to acknowledge that the input button is being pressed by the user, and provides feedback information to the user regarding how much longer the input button should be held down before a time period is reached and when the time period has been reached, the processor unit periodically updating the feedback information; and
wherein the processor unit is further operative to send the first command signal to the module after the user presses the input button for a period of time that is less than the time period and to send the second command signal to the module after the user holds down the input button for at least the time period, thereby causing the multi-function module to perform the second function after the time period has been reached;
wherein the first and second command signals are different, and the first and second functions are different.

2. The apparatus as recited in claim 1, wherein the processor unit continuously updates the feedback information.

3. The apparatus as recited in claim 1, wherein the processor unit continues to update the feedback information until the input button is no longer held down.

4. The apparatus as recited in claim 1, wherein the interface component further comprises a transmitter for sending the first and second command signals to the module.

5. The apparatus as recited in claim 1, wherein the interface component further comprises a receiver for receiving a feedback signal from the module.

6. The apparatus as recited in claim 1, wherein the feedback indicator comprises a display unit.

7. The apparatus as recited in claim 6, wherein the feedback information comprises a progress bar displayed on the display unit.

8. The apparatus as recited in claim 6, wherein the feedback information comprises animated graphics displayed on the display unit.

9. The apparatus as recited in claim 6, wherein the feedback information comprises a text based message displayed on the display unit.

10. The apparatus as recited in claim 9, wherein the text based message comprises numbers.

11. The apparatus as recited in claim 1, wherein the feedback indicator comprises an audio output component.

12. The apparatus as recited in claim 1, wherein the module comprises an FM radio receiver.

13. The apparatus as recited in claim 1, wherein the module comprises a portable music player.

14. An interactive system, comprising:
a multi-function device adapted to perform a first function upon receiving a first command signal and a second function upon receiving a second command signal; and
a handheld interface device in wireless communication with the multi-function device, the interface device comprising:
a transmitter for sending the first and second command signals wirelessly to the multi-function device;
a processor unit operatively coupled to the transmitter;
an input button operatively coupled to the processor unit; and
a display unit operatively coupled to the processor unit;
wherein the display unit provides acknowledgement information to a user to acknowledge that the input button is being activated by the user, and provides feedback information to the user regarding how much longer the input button should be activated before a time period is reached and when the time period has been reached, the processor unit periodically updating the feedback information; and
wherein the processor unit is further operative to send the first command signal wirelessly to the multi-function device via the transmitter after the user activates the input button for a period of time that is less than the time period and to send the second command signal wirelessly to the multi-function device via the transmitter after the user activate the input button for at least the time period, thereby causing the multi-function device to perform the second function after the time period has been reached;
wherein the first and second command signals are different, and the first and second functions are different.

15. The system as recited in claim 14, wherein the processor unit continuously updates the feedback information.

16. The system as recited in claim 14, wherein the processor unit continues to update the feedback information until the at least one input sensing component is no longer activated.

17. The system as recited in claim 14, wherein the interface device further comprises a receiver for receiving a feedback signal from the multi-function device.

18. The system as recited in claim 14, wherein the feedback information comprises a progress bar displayed on the display unit.

19. The system as recited in claim 14, wherein the feedback information comprises animated graphics displayed on the display unit.

20. The system as recited in claim 14, wherein the feedback information comprises a text based message displayed on the display unit.

21. The system as recited in claim 20, wherein the text based message comprises numbers.

22. The system as recited in claim 14, wherein the feedback information further comprises an audio portion.

23. The system as recited in claim 14, wherein the multi-function device comprises an FM radio receiver.

24. The system as recited in claim 14, wherein the multi-function device comprises a portable music player.

25. A method for controlling a multi-function device, comprising:
    detecting a user input signal;
    acknowledging detection of the input signal;
    providing feedback information to a user regarding how much longer the input signal should be detected before a time period is reached and when the time period has been reached;
    updating the feedback information periodically; and
    sending a first command signal to the multi-function device after the user input signal is detected for less than the time period and sending a second command signal to the multi-function device after the user input signal is detected for more than the time period, thereby causing the multi-function device to perform a first function in response to the first command signal, and causing the multi-function device to perform a second function in response to the second command signal and after the time period has been reached;
    wherein the first and second command signals are different, and the first and second functions are different.

26. The method of claim 25, wherein updating the feedback information periodically comprises updating the feedback information continuously.

27. The method of claim 25, wherein acknowledging detection of the input signal comprises displaying a message on a display unit.

28. The method of claim 25, wherein acknowledging detection of the input signal comprises providing an audio message.

29. The method of claim 25, wherein providing feedback information comprises displaying a progress bar on a display unit.

30. The method of claim 25, wherein providing feedback information comprises displaying animated graphics on a display unit.

31. The method of claim 25, wherein providing feedback information comprises displaying a text based message on a display unit.

32. The method of claim 31, wherein displaying a text based message comprises displaying numbers.

33. The method of claim 25, wherein providing feedback information comprises providing an audio message.

34. The method of claim 33, wherein providing an audio message comprises playing audible words.

\* \* \* \* \*